US008824620B2

(12) United States Patent
Knabe

(10) Patent No.: US 8,824,620 B2
(45) Date of Patent: Sep. 2, 2014

(54) FILTER FOR SEPARATING PARTICLES IN A COOLANT FLUID IN A NUCLEAR REACTOR

(75) Inventor: Pawel Knabe, Mainhausen (DE)

(73) Assignee: Areva NP, Courbevoie (FR)

( * ) Notice: Subject to any disclaimer, the term of this patent is extended or adjusted under 35 U.S.C. 154(b) by 611 days.

(21) Appl. No.: 13/119,119

(22) PCT Filed: Sep. 15, 2009

(86) PCT No.: PCT/EP2009/061955
§ 371 (c)(1),
(2), (4) Date: Mar. 15, 2011

(87) PCT Pub. No.: WO2010/031770
PCT Pub. Date: Mar. 25, 2010

(65) Prior Publication Data
US 2011/0170651 A1    Jul. 14, 2011

(30) Foreign Application Priority Data

Sep. 16, 2008   (EP) .................................... 08305556

(51) Int. Cl.
*G21C 15/00*   (2006.01)
*G21C 3/32*    (2006.01)

(52) U.S. Cl.
CPC ........... *G21C 3/3206* (2013.01); *G21Y 2004/30* (2013.01); *G21Y 2002/201* (2013.01); *Y02E 30/40* (2013.01); *G21Y 2002/304* (2013.01)
USPC ........................................................ 376/313

(58) Field of Classification Search
USPC ......... 376/309, 313, 352, 362, 377, 434, 443, 376/446
See application file for complete search history.

(56) References Cited

U.S. PATENT DOCUMENTS

| | | | | |
|---|---|---|---|---|
| 3,212,987 A * | 10/1965 | Mason | | 376/352 |
| 4,828,791 A * | 5/1989 | DeMario | | 376/352 |
| 4,948,555 A * | 8/1990 | Limouzin et al. | | 376/352 |
| 5,255,297 A * | 10/1993 | Bryan | | 376/352 |
| 5,345,483 A * | 9/1994 | Johansson et al. | | 376/313 |
| 5,473,650 A * | 12/1995 | Johansson | | 376/313 |
| 5,488,634 A * | 1/1996 | Johansson et al. | | 376/313 |
| 5,490,189 A * | 2/1996 | Schechter | | 376/313 |
| 6,876,713 B2 | 4/2005 | Nylund | | |
| 6,901,128 B2 * | 5/2005 | Mori et al. | | 376/310 |
| 8,317,035 B2 * | 11/2012 | Elkins et al. | | 210/521 |
| 2003/0026381 A1 * | 2/2003 | Ukai et al. | | 376/446 |
| 2009/1225924 | 9/2009 | Lelickens et al. | | |

FOREIGN PATENT DOCUMENTS

| | | |
|---|---|---|
| GB | 895531 | 5/1962 |
| GB | 2375124 | 11/2002 |
| WO | WO 02075746 | 9/2002 |
| WO | WO 2008012008 | 1/2008 |

* cited by examiner

*Primary Examiner* — Bret Hayes
(74) *Attorney, Agent, or Firm* — Davidson, Davidson & Kappel, LLC

(57) ABSTRACT

A filter is provided which includes channels for circulation of coolant fluid through the filter, at least one channel extending along a channel centerline and includes an upstream section, a downstream section and an intermediate section extending between the upstream section and the downstream section and being enlarged relative to the upstream section and the downstream section. The filter also includes at least one separating member defining inside the intermediate section of the at least one channel an annular passage whose axis is substantially coaxial to the channel centerline in the intermediate section.

20 Claims, 6 Drawing Sheets

FILTER FOR SEPARATING PARTICLES IN A COOLANT FLUID IN A NUCLEAR REACTOR

The present invention relates to a filter for separating particles in a coolant fluid in a nuclear reactor, of the type comprising channels for circulation of coolant fluid through the filter, at least one channel extending along a channel centerline and comprising an upstream section, a downstream section and an intermediate section extending between the upstream section and the downstream section and being enlarged relative to the upstream section and the downstream section.

BACKGROUND

U.S. Pat. No. 6,876,713 A1 discloses a filter of the above-mentioned type in which the channels are elongated transversely to the flow direction and separating members are provided in the form of elongated circular cylinders each extending transversely to the flow direction in the intermediate section of one of the channels to define in the channel at least one passage bent in the flow direction to catch particles elongated in the flow direction.

However, elongated particles extending transversely to the fluid flow direction might flow without being caught by the separating members.

SUMMARY OF THE INVENTION

An object of the invention is to provide a filter allowing catching particles more efficiently along with limiting the fluid flow resistance of the filter.

To this end, the invention provides a filter of the above-mentioned type, comprising at least one separating member defining inside the intermediate section of the at least one channel an annular passage whose axis is substantially coaxial to the channel in the intermediate section.

In other embodiments, the filter comprises one or several of the following features, taken in isolation or in any technical feasible combination:

the filter comprises centering elements for maintaining the or each separating member spaced from the inner surface of the corresponding intermediate section;

the filter comprises spherical separating members;

the filter comprises separating members having an elliptical cross section;

the filter comprises separating members having a double cone shape;

the filter comprises at least one pair of separating members disposed inside the same intermediate section to define a pair of coaxial annular passages whose axis is substantially coaxial to the channel centerline in the intermediate section a first separating member being tubular and defining an outer annular fluid flow passage with the inner surface of the intermediate section, the second separating member being disposed inside the first separating member and defining therein an inner annular passage;

the filter comprises at least one separating member having at least one fluid flow hole passing through the separating member;

the filter comprises at least a first set of channel and a second set of channels, the intermediate sections of the channels of the first set being offset relative to the intermediate sections of the channels of the second set along the filter main flow direction of the coolant fluid through the filter;

the channels are arranged in a pattern such that each channel of the first set is surrounded by channels of the second set;

the filter comprises a one-piece filtering plate having the channels extending there through, each channel being defined by a duct extending through the filtering plate and having a narrow section and a enlarged section, and a tubular insert inserted inside the enlarged section;

the filter comprises a filtering plate comprising at least two stacked parts, each channel extending through the different parts and each separating member being disposed between two of plate-like parts;

the filtering plate comprises a lower part, an upper part and an intermediate part interposed between the upper part and the lower part, each separating member being disposed between the intermediate part and one of the upper and lower parts;

The invention also provides to a nuclear fuel assembly lower nozzle defining a filter as defined above.

In an embodiment, the nuclear fuel assembly comprises a bundle of fuel rods and an armature for supporting the fuel rods, the armature comprising a lower nozzle and an upper nozzle, the fuel rods extending between the nozzles, wherein the lower nozzle defines a filter as defined above.

BRIEF DESCRIPTION OF THE DRAWINGS

The invention and its advantages will be better understood on reading the following description given solely by way of example and with reference to the appended drawings, in which.

DETAILED DESCRIPTION

Figure 1:
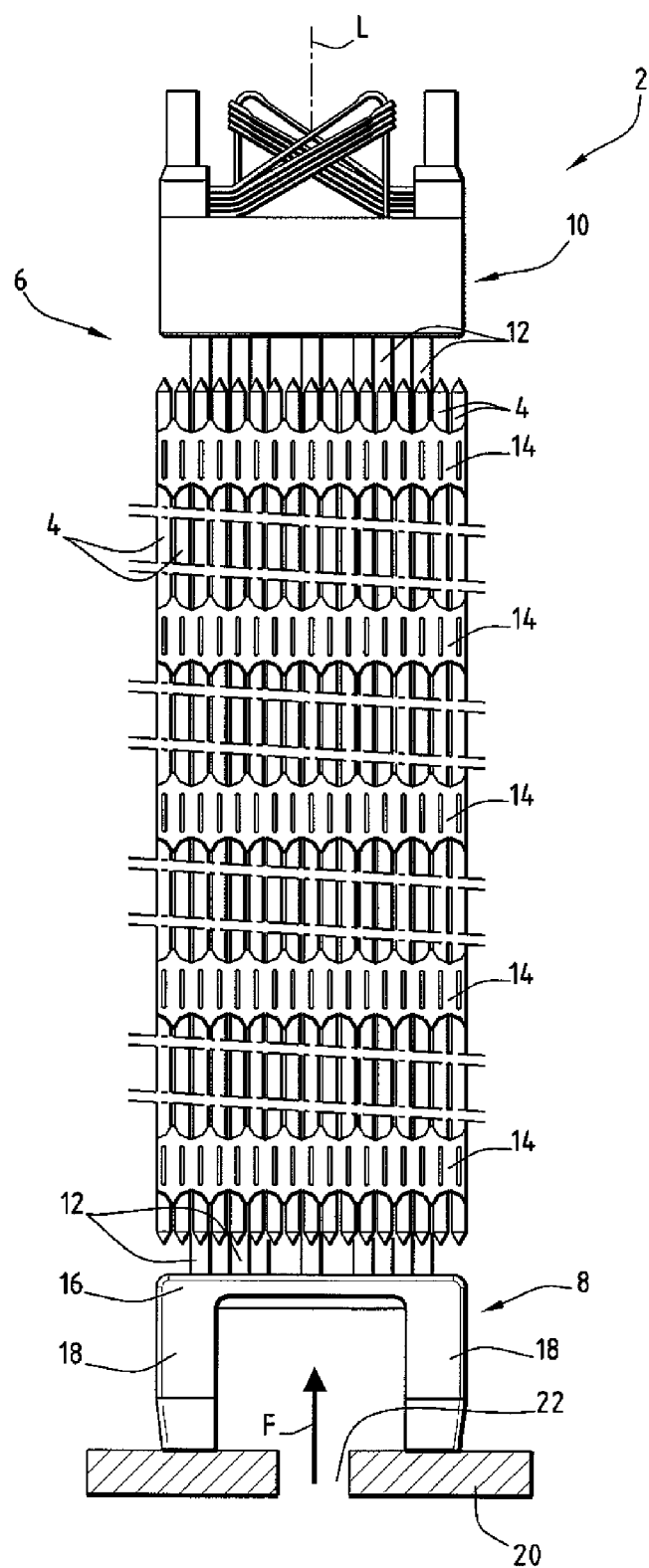
FIG. 1 is an elevation side view of a nuclear fuel assembly having a lower nozzle forming a filter.

The nuclear fuel assembly 2 of FIG. 1 comprises a bundle of nuclear fuel rods 4 and an armature 6 for supporting the fuel rods 4.

The fuel assembly 2 is elongated along a longitudinal axis L extending vertically when the fuel assembly 2 is disposed inside a nuclear reactor. In the following, the terms "upper" and "lower" refer to the position of the fuel assembly 2 in a nuclear reactor.

Each fuel rod 4 comprises a tubular cladding, pellets of nuclear fuel stacked inside the cladding and caps closing the ends of the cladding.

The armature 6 comprises a lower nozzle 8, an upper nozzle 10, a plurality of guide tubes 12 and a plurality of spacer grids 14.

The lower nozzle 8 and the upper nozzle 10 are spaced one from the other along axis L. The guide tubes 12 connect the lower nozzle 8 and the upper nozzle 10 together. The guide tubes 12 extend parallel to axis L and maintain a predetermined spacing between the nozzles 8, 10. Each guide tube 12 opens upwards through the upper nozzle 10 for allowing insertion of a control rod into the guide tube 12.

The spacer grids 14 are distributed along the guide tubes 12 between the nozzles 8, 10 and connected to the guide tubes 12.

The fuel rods 4 extend parallel to axis L between the nozzles 8, 10 and through the spacer grids 14. The spacer grids 14 support the fuel rods 4 transversely and longitudinally relative to axis L.

The lower nozzle 8 defines a filter for filtering coolant fluid flowing upwardly along the fuel assembly 2. The lower nozzle 8 comprises a filtering plate 16 and a plurality of feet 18 extending downwardly from the filtering plate 16.

Figures 2, 3:
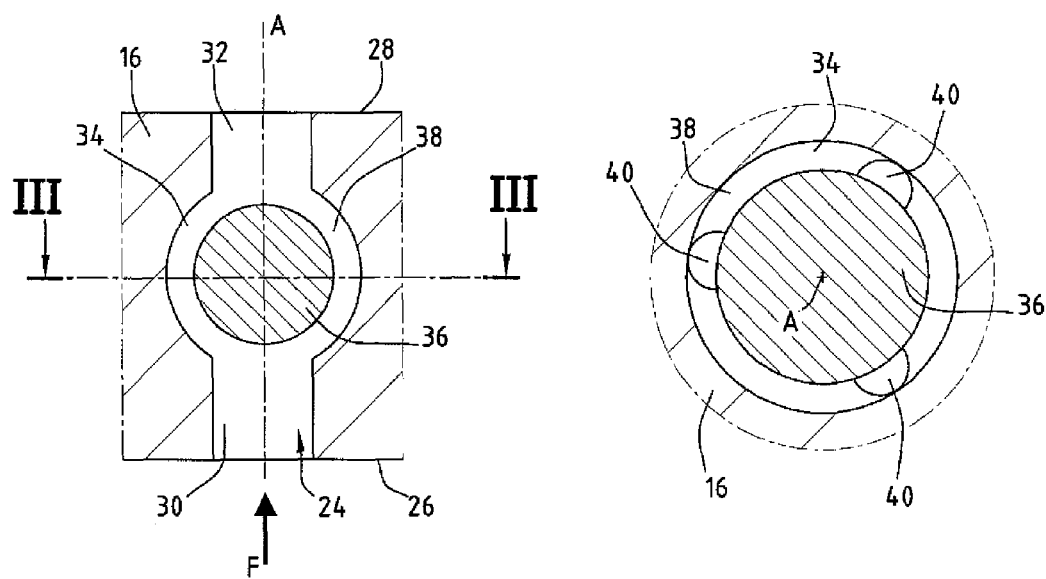
FIGS. 2 and 3 are partial sectional views of a filtering plate of the lower nozzle of FIG. 1, illustrating one channel extending through the filtering plate.

As illustrated on FIG. 1, the feet 18 rests on the core support plate 20 of a nuclear reactor and the filtering plate 16 extends horizontally above at least one water inlet 22 of said core support plate 20 adapted for allowing water to flow upwardly out from the inlet 22 and through the filtering plate 16 in a main flow direction illustrated by arrow F and substantially parallel to the longitudinal axis L The filtering plate 16 comprises a plurality of analogous fluid flow channels 24 for allowing water to flow through the filtering plate 16, only one channel 24 being visible on the partial sectional views of FIG. 2 and FIG. 3. FIG. 2 is a side sectional view and FIG. 3 is a top sectional view along on FIG. 2.

The channel 24 extends along a channel centerline A through the filtering plate 16 from a lower face 26 facing downwardly to an opposed upper face 28 facing upwardly.

The channel 24 comprises along its channel centerline A an inlet upstream section 30, an outlet downstream section 32 and an intermediate section 34 extending between the upstream section 30 and the downstream section 32.

In the embodiment illustrated on FIG. 2, the centerline A is straight and substantially parallel to the longitudinal axis L of the fuel assembly 2.

The downstream section 32 and the upstream section 30 have substantially the same cross-section. The intermediate section 34 is enlarged transversely to the channel centerline A relative to each of the upstream section 30 and the downstream section 32.

The upstream section 30 and the downstream section 32 each have a cylindrical shape of circular cross-section, and the intermediate section 34 is spherical, the inner diameter of the intermediate section 34 being greater than the inner diameter of each of the upstream section 30 and the downstream section 32.

The filtering plate 16 comprises a separating member 36 disposed inside the intermediate section 34 of the channel 24 so as to define therein an annular passage 38 whose axis is parallel and namely coaxial to the channel centerline A in the intermediate section 34.

The annular passage 38 is bent along channel centerline A. To this end, the separating member 36 has a dimension transverse to the channel centerline A superior to that of each of the upstream section 30 and the downstream section 32.

The separating member 36 is spherical and has an outer diameter that is inferior to the inner diameter of the intermediate section 34 but superior to the inner diameter of each of the upstream section 30 and the downstream section 32.

The filtering plate 16 comprises centering elements 40 (FIG. 3) disposed between the separating member 36 and the inner surface of the intermediate section 34 to maintain the spacing between the separating member 36 and the inner surface of the intermediate section 34 and define the annular passage 38. The centering elements 40 are provided in the form of bosses distributed on the outer surface of the separating member 36. Optionally or alternatively, centering bosses are distributed on the inner surface of the intermediate section 34.

In use a flow of coolant fluid flows through the channel 24 mainly parallel to the channel centerline A.

The coolant fluid might carry debris which can potentially damage the fuel rods 4 (FIG. 1). The annular passage 38 allows an important flow of coolant fluid while having locally small transverse dimensions to efficiently catch debris.

The bending of the annular passage 38 along the channel centerline A enables to efficiently catch elongated debris extending parallel to the channel centerline A.

The annular passage 38 coaxial to the channel centerline A is curved in a plane perpendicular to the channel centerline A (FIG. 3), which enhances filtering by enabling to catch elongated particles extending in any direction inclined relative to the channel centerline A.

The annular passage 38 having an axis parallel to channel centerline A in the intermediate section 34, and thus to the main direction of the channel flow in the intermediate section 34, enables to limit the flow resistance through the channel 24.

Figure 4:
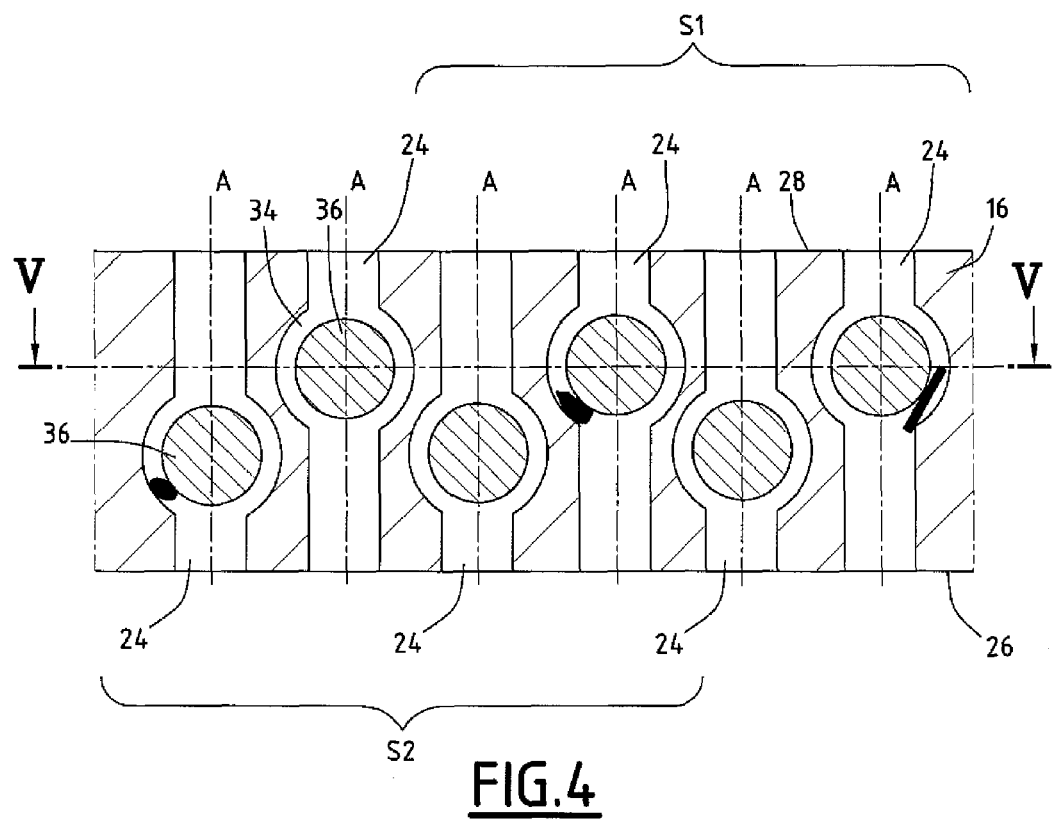
FIGS. 4 and 5 are views analogue to that of FIGS. 2 and 3 respectively and illustrating several channels.
Figure 5:
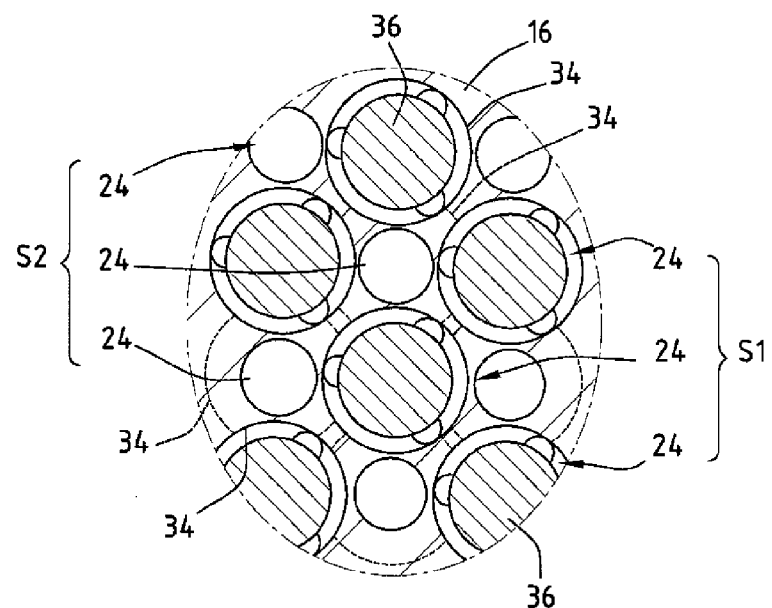

FIGS. 4 and 5 are enlarged sectional views corresponding to FIGS. 2 and 3 respectively. FIG. 5 is a sectional view along V-V on FIG. 4.

As illustrated on FIGS. 4 and 5, the filtering plate 16 comprises a plurality of channels 24 extending parallel to each other through the filtering plate 16, one separating member 36 being disposed inside the intermediate section 34 of each channel 24.

The filtering plate 16 comprises a first set S1 of channels 24 and a second set S2 of channels 24, the channels 24 of the first set S1 having their intermediate sections 34 offset relative to that of the channels 24 of the second set S2 along the direction perpendicular to the plane of the filtering plate 16.

Each channel 24 of the first set S1 is adjacent to channels 24 of the second set S2 with a reduced distance between the channel centerlines A, by providing intermediate sections 34 overlapping in view from the main flow direction F (see FIG. 5). As a result, a great number of channels 24 is provided in a limited area and the fluid flow resistance of the lower nozzle 8 is reduced.

The channels 24 of the first set S1 and the channels 24 of the second set S2 are staggered in rows (FIGS. 4 and 5) to provide a very compact arrangement.

The intermediate section 34 and the separating member 36 disposed therein can vary in shape as it will appear from the following description of alternative embodiments illustrated on FIGS. 6 to 9.

Figure 6:
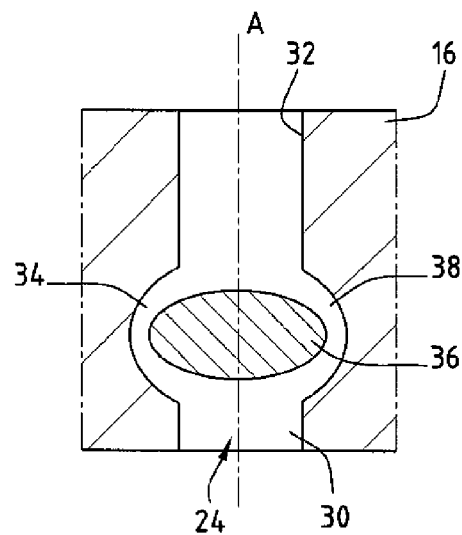
FIGS. 6 to 9 are views analogue to that of FIG. 2 and illustrating alternative embodiments.

In the alternative embodiment of FIG. 6, the separating member 36 has an elliptical cross-section in a plane parallel to the channel centerline A (FIG. 6). The intermediate section 34 has a corresponding shape.

As a result, the curvature radius of the annular passage 38 along the channel centerline A is made small to increase the debris catching capacity.

Figure 7:
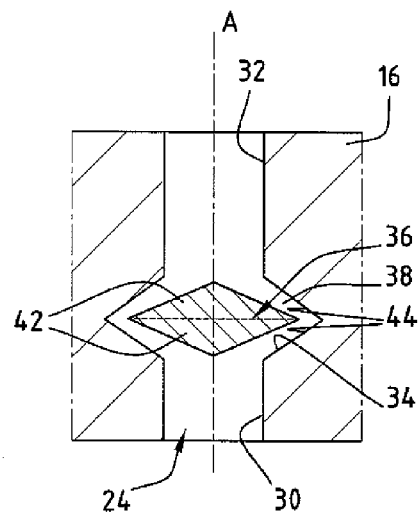

In the alternative embodiment of FIG. 7, the separating member 36 has a double cone shape formed of two coaxial conical portions 42 of circular base pointing in opposite direction. The inner surface of the intermediate section 34 has a corresponding shape and is formed of two coaxial conical segments 44 of circular base converging in opposite directions.

As a result, the annular passage 38 is angled whereby debris catching can be increased.

Figure 8:
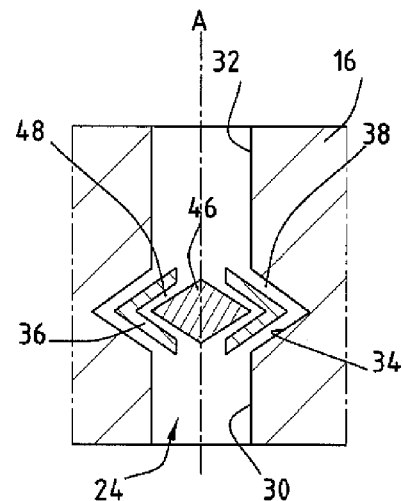

In the alternative embodiment of FIG. 8, a pair of separating members 36, 46 is disposed inside the intermediate section 34 to define two co-axial annular passages 38, 48. The first separating member 36 is tubular and defines an outer annular passage 38 with the inner surface of the intermediate section 34. The second separating member 46 is disposed inside the first separating member 36 and defines therein an inner annular passage 48. The inner annular passage 48 is bent along the channel centerline A and its axis is coaxial to the channel centerline A.

As a result, the fluid flow resistance is reduced while filtering efficiency is maintained.

Figure 9:
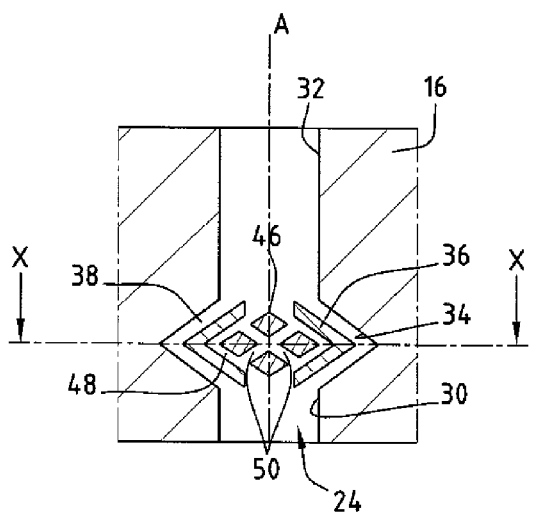

In the alternative embodiment of FIG. 9, the second separating member 46 is provided with fluid flow holes 50 extending through the second separating member 46 for reducing fluid flow resistance. The holes 50 are inclined relative to the channel centerline A in the intermediate section 34. Two intersecting holes 50 are illustrated on FIG. 9.

Figure 10:
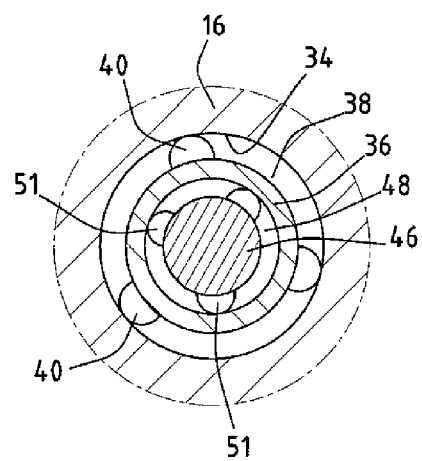
FIG. 10 is a view analogue to that of FIG. 3 and corresponding to the embodiments of FIGS. 8 and 9.

FIG. 10 is a sectional view along X-X on FIG. 9 and illustrates the centering elements 40 provided between the first separating member 36 and the inner surface of the intermediate section 34, and second centering elements 51 provided between the second separating member 46 and the first separating member 36 to maintain the annular space between the inner surface of the first separating member 36 and the outer surface of the second separating member 46.

The embodiments of FIGS. 2 and 6 to 9 may be combined. It is for example possible to provide holes 50 extending through a separating member 36 such as that of FIGS. 2, 6 and 7.

FIGS. 11 to 15 illustrate successive steps of a method for manufacturing a filtering plate 16 as that of the lower nozzle 8 of FIGS. 1 to 5.

Figure 11:
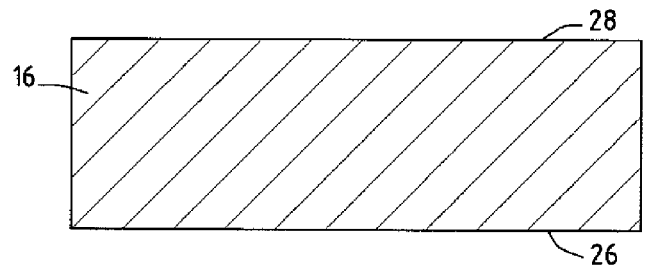
FIGS. 11 to 15 show different steps of a method of manufacturing a lower nozzle.

In a first step illustrated on FIG. 11 a solid plate 16 is provided.

Figure 12:
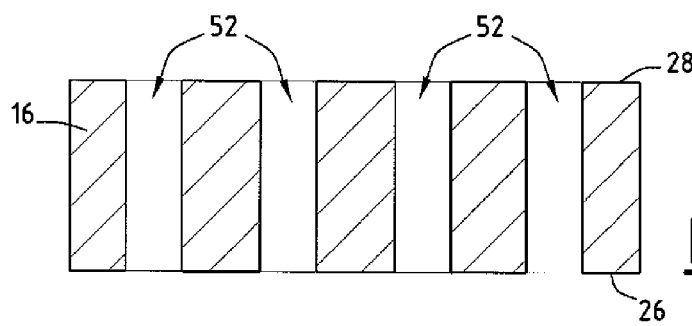

In a second step illustrated on FIG. 12, a plurality of through ducts 52 of circular cross-section is machined through the plate 16. Each duct 52 extends between the lower face 26 and the upper face 28 of the plate 16.

Figure 13:
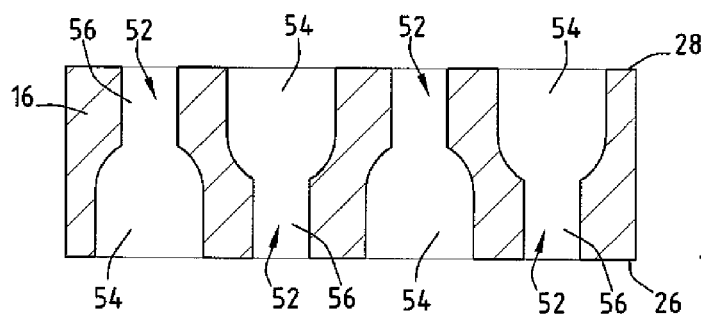

In a third step illustrated on FIG. 13, a section of each duct 52 is enlarged, e.g. by machining the plate 16, whereby each duct 52 subsequently has an enlarged section 54 and a narrow section 56.

The enlarged section 54 of each duct 52 of a first set S1 extends from the upper face 28 of the filtering plate 16, and the enlarged section 54 of each duct 52 of a second set S2 extends from the lower face 26 of the filtering plate 16.

Figure 14:
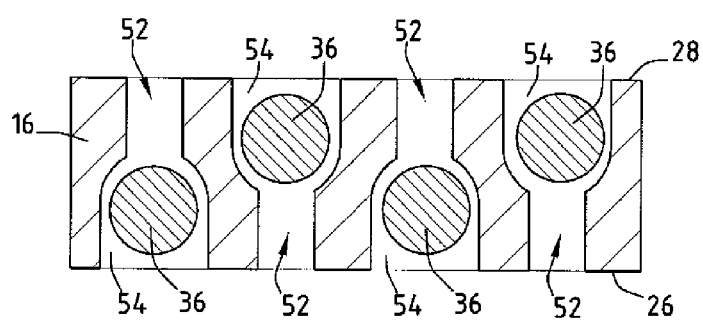

In a fourth step illustrated on FIG. 14, separating members 36 are introduced in the enlarged section 54 of each duct 52.

Figure 15:
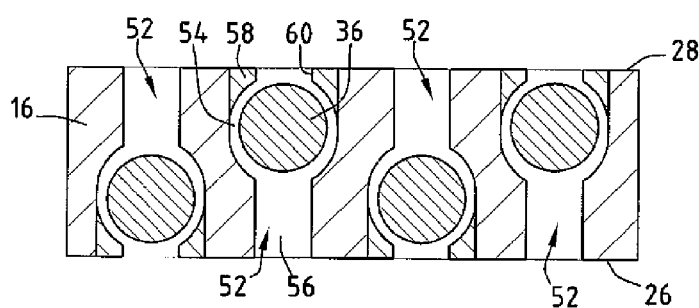

In a fifth step illustrated on FIG. 15, a tubular insert 58 is introduced in the enlarged section 54 of each duct 52. The tubular insert 58 has a bore 60 of smaller cross-section than the separating member 36.

Each channel 24 is thus defined in a respective duct 52, one of the downstream section 32 and the upstream section 30 being defined by the bore 60 of the tubular insert 58 and the other by the narrow section 56 of the duct 52. The intermediate section 34 of the channel 24 is defined inside the enlarged section 54. Each separating member 36 is retained in the corresponding channel 24 by the tubular insert 58.

The ducts 52 of the first set S1 and the ducts 52 of the second set S2 enable to obtain two sets of channels 24 having offset intermediate sections 34 with a transverse spacing between channels 24 of the first set S1 and channels 24 of the second set S2 inferior to the inner diameter of the intermediate sections 34 as explained with reference to FIGS. 4 and 5.

Figure 16:
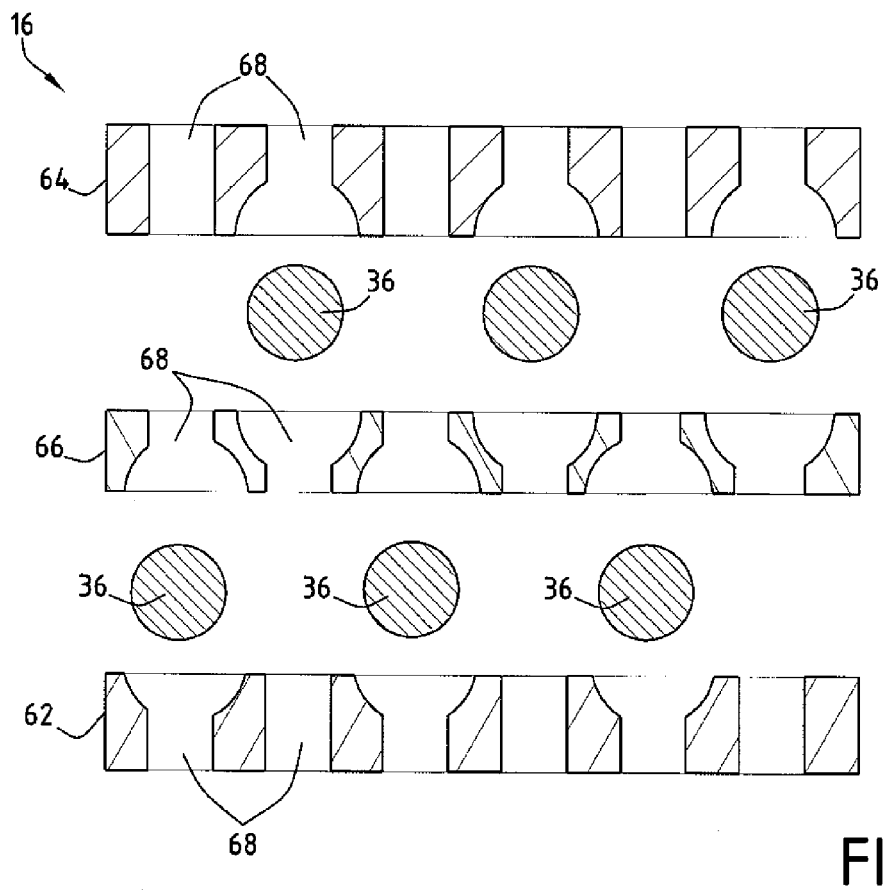
FIGS. 16 and 17 show steps of another method of manufacturing a lower nozzle.
Figure 17:
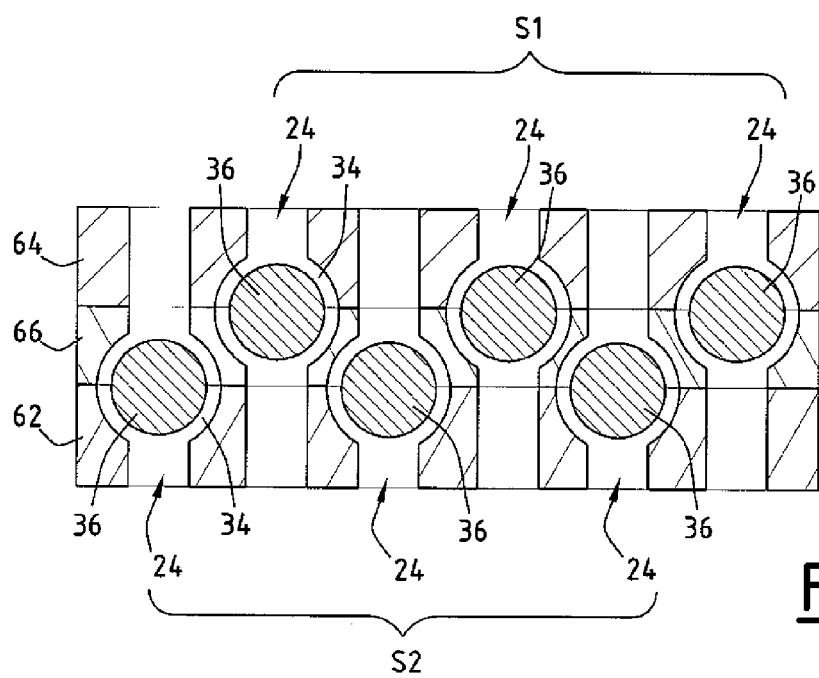

FIGS. 16 and 17 illustrate another method of manufacturing a filtering plate 16 as that of the lower nozzle 8 of FIGS. 1 to 5.

As illustrated on FIGS. 16 and 17, the filtering plate 16 comprises superimposed plate-like parts 62, 64, 66, each channel 24 extending through the different parts 62, 64, 66 and each separating member 36 being disposed between two of plate-like parts 62, 64, 66.

The plate-like parts 62, 64, 66 have aligned holes 68 of different diameters formed therein so as to define channels 24 upon stacking the parts 62, 64, 66. The intermediate section 34 of each channel 24 is defined at the junction of two adjacent parts 62, 64, 66, by enlarged sections of the holes 68.

In the illustrated embodiment, the filtering plate 16 comprises a lower part 62, an upper part 64 and an intermediate part 66. The intermediate sections 34 (FIG. 17) of the channels 24 of the first set S1 are formed at the junction between the upper part 64 and the intermediate part 66, and the intermediate sections 34 of the channels 24 of the second set S2 are formed at the junction between the intermediate part 66 and the lower part 62.

The aligned holes 68 of the superimposed parts 62, 64, 66 are arranged to form the first set S1 of channels 24 and the second set S2 of channels 24 with offset intermediate section 34.

One separating member 36 is disposed inside each channel 24 of the first set S1 between the upper part 64 and the intermediate part 66, and one separating member 36 is disposed inside each channel 24 of the second set S2 between the intermediate part 66 and the lower part 62.

This arrangement allows obtaining two sets S1, S2 of channels 24 having offset intermediate sections 34 with a transverse spacing between the channel centerlines A inferior to the inner diameter of the intermediate sections 34.

This method allows providing more than two sets S1, S2 of channels 24 by increasing the number of intermediate sections 34 forming the filtering plate 16.

In the illustrated embodiments, the channels extend along straight channel centerlines A (or channel axes) which are substantially parallel to the fuel assembly axis L in order to limit the flow resistance.

In alternative embodiments, channels extend along straight channel centerlines which are inclined at an angle comprised between 0 and 45° relative to the fuel assembly axis L.

The invention is not to be limited to channels extending along straight channel centerlines. A channel may also extend along a broken or curved centerline.

Hence, in a general manner, the separating member disposed inside the intermediate section is arranged to define therein an annular passage whose axis is substantially coaxial to the channel centerline in the intermediate section.

The axis of the annular passage is thus substantially parallel to the main direction of the coolant fluid flow through the intermediate section of the channel, whereby particles elongated in a direction inclined relative to the channel centerline in the intermediate section are efficiently caught. Beside, providing an annular passage bent along the channel centerline allows efficiently catching particles elongated parallel to the channel centerline in the intermediate section. Moreover, the fluid flow resistance is kept low since the axis of the annular passage is substantially coaxial to the channel centerline in the intermediate section.

The invention is applicable to lower nozzles of fuel assembly for Light Water Reactors (LWR) such as Boiling Water Reactors (BWR) or Pressurized Water Reactors (PWR), and more generally to any filter.

The invention claimed is:
1. A filter for separating particles in a coolant fluid in a nuclear reactor, the filter comprising:

channels for circulation of the coolant fluid through the filter, at least one of the channels extending along a channel centerline, the at least one channel having an inlet upstream section, an outlet downstream section and an intermediate section, the intermediate section extending between the inlet upstream section and the outlet downstream section and being enlarged relative to the inlet upstream section and the outlet downstream section, the inlet upstream section, the intermediate section and the outlet downstream section being arranged along the channel centerline; and at least one separating member defining inside the intermediate section of the at least one channel an annular passage, the annular passage being arranged substantially concentric to the channel centerline in the intermediate section.

2. The filter according to claim 1 further comprising centering elements for maintaining the at least one separating member spaced from an inner surface of the corresponding intermediate section.

3. The filter according to claim 1 wherein the at least one separating member is spherical.

4. The filter according to claim 1 wherein the at least one separating member has an elliptical cross section.

5. The filter according to claim 1 wherein the at least one separating member has a double cone shape.

6. The filter according to claim 1 wherein a first and a second separating member are disposed inside a same intermediate section to define an inner and an outer coaxial annular passage, the inner and outer coaxial annular passage having an axis substantially coaxial to the channel centerline in the same intermediate section, the first separating member being tubular and defining the outer coaxial annular passage with the inner surface of the intermediate section, the second separating member being disposed inside the first separating member and defining therein an inner annular passage.

7. The filter according to claim 1 wherein the at least one separating member has at least one fluid flow hole passing through the separating member.

8. The filter according to claim 1 wherein the channels include at least a first set of channels and a second set of channels, the intermediate sections of the first set of channels being offset relative to the intermediate sections of the second set of channels along a filter main flow direction of the coolant fluid through the filter.

9. The filter according to claim 8 wherein the channels are arranged in a pattern such that each channel of the first set of channels is surrounded by channels of the second set of channels.

10. The filter according to claim 1 wherein the channels are defined by a one-piece filtering plate having a plurality of ducts extending therethrough and a plurality of tubular inserts, each duct having a narrow duct section and an enlarged duct section, each enlarged duct section having a respective one of the tubular inserts inserted therein, each of the channels being defined by one of the ducts and the respective tubular insert inserted inside the enlarged duct section of the duct.

11. The filter according to claim 10 wherein the filtering plate comprises at least two stacked parts, each of the channels extending through the stacked parts and each separating member being disposed between two of the stacked parts.

12. The filter according to claim 11 wherein the filtering plate comprises a lower part, an upper part and an intermediate part interposed between the upper part and the lower part, each separating member being disposed between the intermediate part and one of the upper and lower parts.

13. A nuclear fuel assembly lower nozzle defining a filter as recited in claim 1.

14. The nuclear fuel assembly comprising a bundle of fuel rods and an armature for supporting the fuel rods, the armature comprising a lower nozzle and an upper nozzle, the fuel rods extending between the nozzles, wherein the lower nozzle defines a filter as recited in claim 13.

15. A filter for separating particles in a coolant fluid in a nuclear reactor, the filter comprising:

channels for circulation of the coolant fluid through the filter, at least one of the channels extending along a channel centerline, the at least one channel having an upstream section, a downstream section and an intermediate section, the intermediate section extending between the upstream section and the downstream section and being enlarged relative to the upstream section and the downstream section; and at least one separating member defining inside the intermediate section of the at least one channel an annular passage, the annular passage having an axis substantially coaxial to the channel centerline in the intermediate section, wherein a first and a second separating member are disposed inside a same intermediate section to define an inner and an outer coaxial annular passage, the inner and outer coaxial annular passage having an axis substantially coaxial to the channel centerline in the same intermediate section, the first separating member being tubular and defining the outer coaxial annular passage with the inner surface of the intermediate section, the second separating member being disposed inside the first separating member and defining therein an inner annular passage.

16. A nuclear fuel assembly lower nozzle defining a filter as recited in claim 15.

17. The nuclear fuel assembly comprising a bundle of fuel rods and an armature for supporting the fuel rods, the armature comprising a lower nozzle and an upper nozzle, the fuel rods extending between the nozzles, wherein the lower nozzle defines a filter as recited in claim 16.

18. A filter for separating particles in a coolant fluid in a nuclear reactor, the filter comprising:

channels for circulation of the coolant fluid through the filter, at least one of the channels extending along a channel centerline, the at least one channel having an inlet upstream section, an outlet downstream section and an intermediate section, the intermediate section extending between the inlet upstream section and the outlet downstream section and being enlarged relative to the inlet upstream section and the outlet downstream section, the inlet upstream section, the intermediate section and the outlet downstream section being arranged along the channel centerline; and at least one separating member defining inside the intermediate section of the at least one channel an annular passage, the annular passage having an axis substantially coaxial to the channel centerline in the intermediate section, wherein the channels are defined by a one-piece filtering plate having a plurality of ducts extending therethrough and a plurality of tubular inserts, each duct having a narrow duct section and an enlarged duct section, each enlarged duct section having a respective one of the tubular inserts inserted therein, each of the channels being defined by one of the ducts and the respective tubular insert inserted inside the enlarged duct section of the duct.

19. The filter according to claim 18 wherein the filtering plate comprises at least two stacked parts, each of the channels extending through the stacked parts and each separating member being disposed between two of the stacked parts.

20. The filter according to claim 19 wherein the filtering plate comprises a lower part, an upper part and an intermediate part interposed between the upper part and the lower part, each separating member being disposed between the intermediate part and one of the upper and lower parts.

* * * * *